Figure 1:
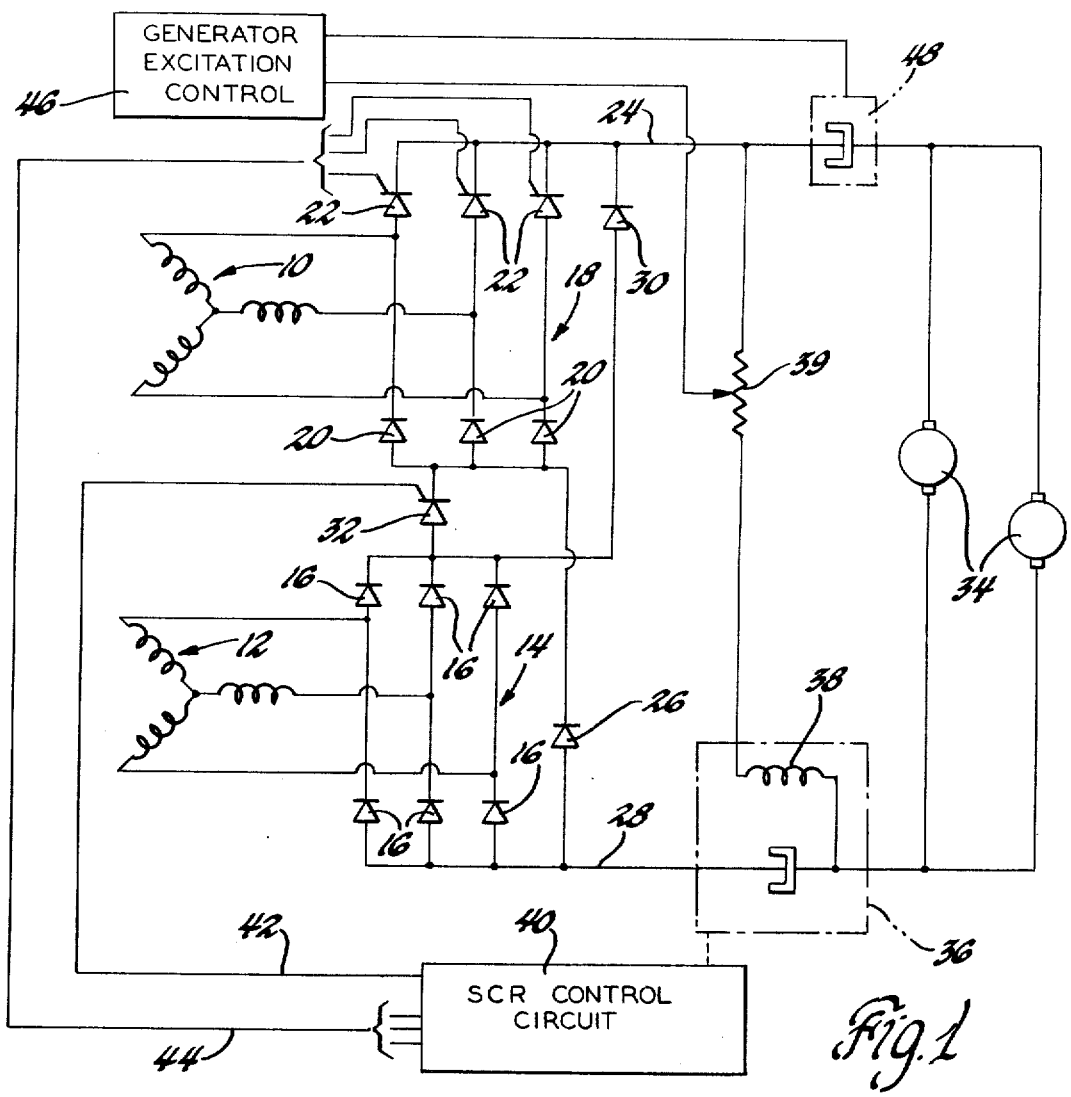

United States Patent [19]

Johnson

[11] 4,009,431
[45] Feb. 22, 1977

[54] SERIES PARALLEL TRANSITION FOR POWER SUPPLY

[75] Inventor: Lauren L. Johnson, Westchester, Ill.

[73] Assignee: General Motors Corporation, Detroit, Mich.

[22] Filed: Sept. 8, 1975

[21] Appl. No.: 611,073

[52] U.S. Cl. .................................. 322/7; 307/71; 318/34; 321/27 R
[51] Int. Cl.$^2$ .................... H02P 9/00; H02M 7/04
[58] Field of Search ........... 318/34, 440, 83; 321/5, 321/27 R; 307/71; 322/7, 90

[56] References Cited

UNITED STATES PATENTS

| | | | |
|---|---|---|---|
| 3,257,597 | 6/1966 | Weiser | 321/27 R |
| 3,459,957 | 8/1969 | Kelley | 307/71 |

FOREIGN PATENTS OR APPLICATIONS

| | | | |
|---|---|---|---|
| 2,254,937 | 5/1974 | Germany | 321/27 R |
| 223,898 | 11/1968 | U.S.S.R. | 321/5 |

Primary Examiner—William H. Beha, Jr.
Attorney, Agent, or Firm—Warren D. Hill

[57] ABSTRACT

An AC generator or other AC source has two identical output sections which are connected through corresponding rectifiers to drive a DC load such as a group of DC traction motors connected in parallel for driving a locomotive. The rectifiers are selectively placed in parallel to provide a high current low voltage mode and in series to provide a low current high voltage mode, thus furnishing a wide range of voltage and current at a given power level to satisfy a broad range of motor requirements with a power source of limited size and capability. To effect smooth transition, one of the rectifiers includes SCR's to modulate the rectifier output voltage. During transition that rectifier is phase back to zero voltage, allowing the other rectifier to supply the full load requirements and then the rectifiers are switched from series to parallel or vice versa whereupon the modulated rectifier is returned to its full voltage. Whenever the rectifiers are in series, the modulation of the one rectifier is accomplished gradually to allow the other rectifier time to take on added voltage.

3 Claims, 5 Drawing Figures

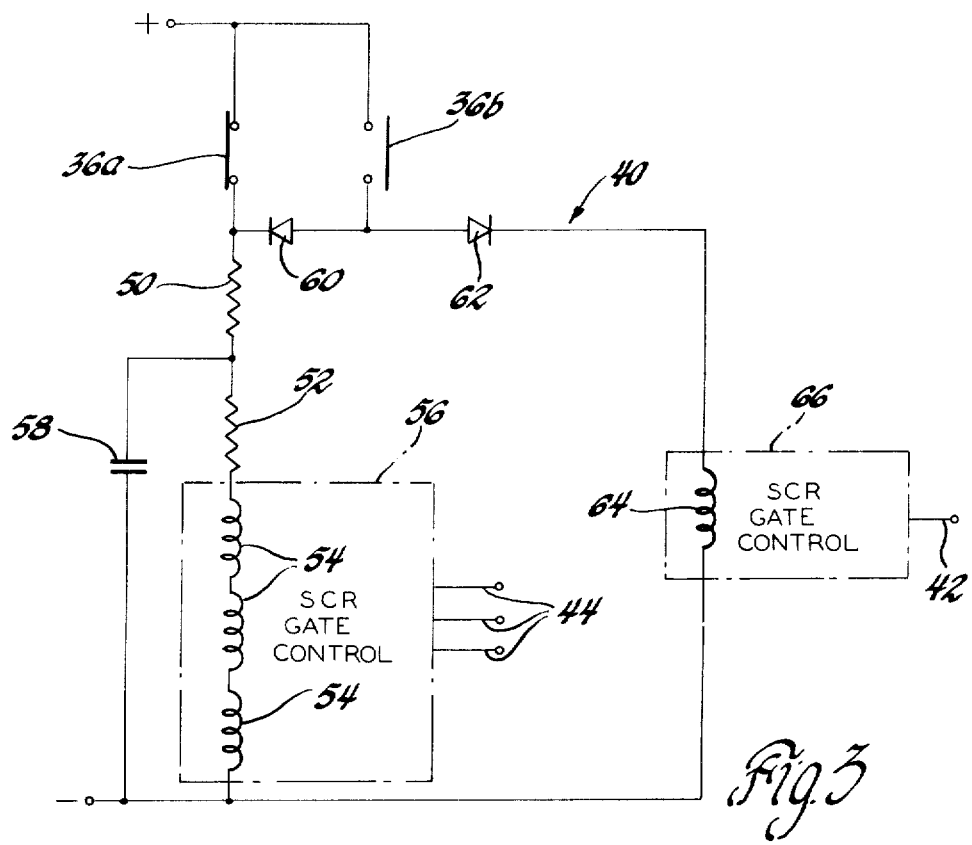
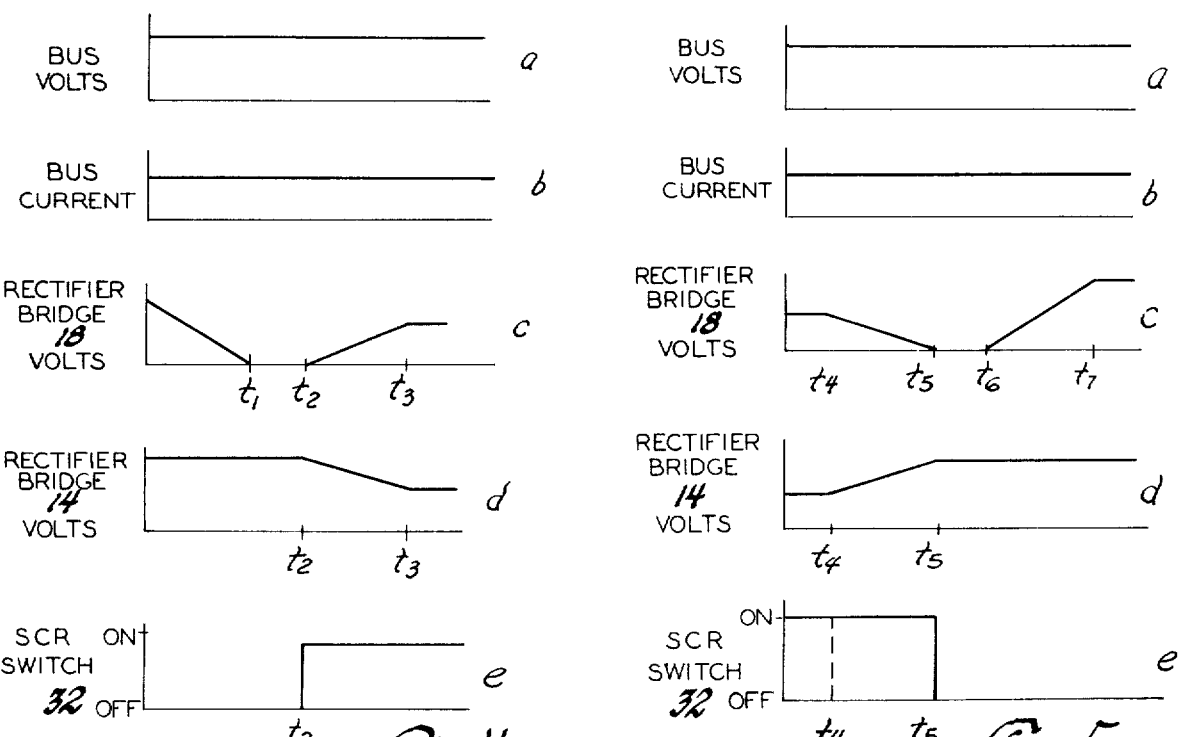

SERIES PARALLEL TRANSITION FOR POWER SUPPLY

This invention relates to electrical power transmission and particularly to a transition circuit for changing between a high current, low voltage mode and to a low current, high voltage mode.

Locomotives driven by electrical DC traction motors are conventionally driven by AC generators. In order to limit the weight, size and expense of the generators, it has been the practice to design generators which are unable to supply the full range of current and voltage required to properly operate any given motor during both low speed and high speed conditions, and to compensate for the generator limitation by arranging the traction motors in an array of parallel pairs and switching the motors of each pair between series and parallel connections when going from one speed range to another. It has also been proposed to utilize pairs of generators or a pair of outputs on a single generator which are switched from series to parallel to extend their operating range. In such systems, however, the generator switching has been accompanied by abrupt power interruptions resulting in severe mechanical shock to the electrical power equipment and to the locomotive.

It is therefore a general object of this invention to provide a circuit for electrical power source transition from one mode to another smoothly and without disturbance of output power flow.

Another object of the invention is to utilize in such a transition circuit solid state devices to minimize or eliminate mechanical switching during transition.

The invention is carried out by providing two similar output sections of an AC source, each connected to rectifier circuits which are selectively connected in series or parallel, voltage modulating elements in one of the rectifier circuits to vary the output voltage thereof, a switch effective when closed for connecting the rectifier circuits in series, a pair of circuit paths for connecting the rectifier circuits in parallel when the switch is open, and an arrangement for reducing the voltage of the one rectifier circuit to substantially zero during transition switching and returning the rectifier circuit output to full voltage after switching is completed.

Figure 2:
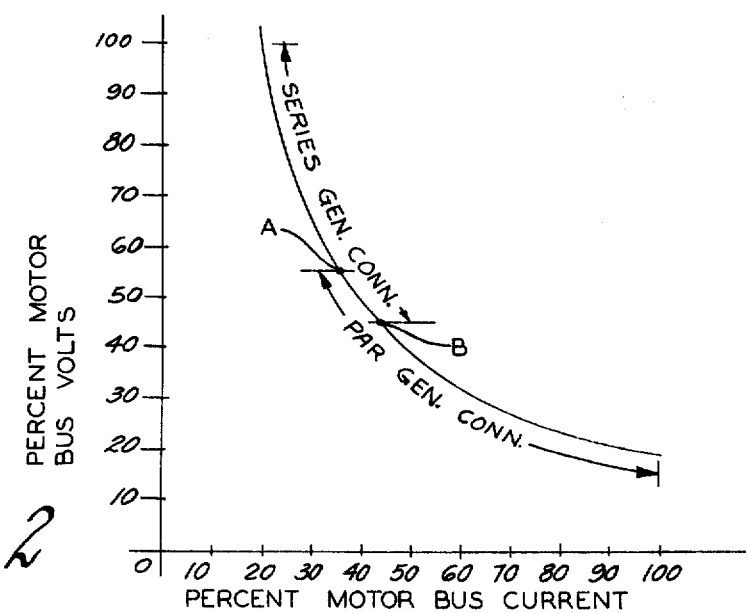

The above and other advantages will be made more apparent from the following specification taken in conjunction with the accompanying drawings wherein like reference numerals refer to like parts and wherein;

FIG. 1 is an electrical diagram of an electric power transmission system having a transition circuit according to the invention, FIG. 2 is a diagram showing a constant horsepower curve for the system of FIG. 1, FIG. 3 is a schematic diagram of the SCR control circuit of FIG. 1, and FIGS. 4 and 5 are diagrams illustrating circuit condition in the circuit of FIG. 1 during transitions from parallel to series and series to parallel respectively.

Referring to FIG. 1, an AC generator has two groups of three phase armature windings represented as two identical generator output sections 10 and 12. The output section 12 is connected to a three phase rectifier bridge 14 that includes six diodes 16. The output section 10 is connected to a three phase full wave rectifier 18 having three diodes 20 and three SCR's 22 arranged so that with proper gating the rectifier output may be modulated between full output voltage and zero voltage. The rectifier 18 is connected at its positive end to a power transmission bus 24 and at its other end through a power diode 26 to a power transmission bus 28. The rectifier bridge 14 has its positive end connected through power diode 30 to bus 24 and its negative end connected to bus 28. In addition, the positive end of the rectifier bridge 14 is connected through an SCR 32 to the negative end of the rectifier bridge 18. A pair of DC traction motors 34 forming the load of the system are connected in parallel across the buses 24 and 28. A transition relay 36 responsive to the total load current going through bus 28 and to the motor voltage includes a coil 38 connected to bus 28 and connected through resistor 39 to bus 24. The relay 36 determines the desirable transition point between series and parallel connection of the rectifier bridges. The relay 36 is primarily controlled by motor voltage but has a motor current restraint imposed thereon. The transition relay 36 triggers operation of an SCR control circuit 40 which produces an output on line 42 to gate the SCR 32 and further produces outputs on lines 44 which control the gates of the SCR's 22 in the rectifier bridge 18. A generator excitation control 46 has an input from a current sensor 48 in the bus 24 and another input from a tap on resistor 39 which provides respectively, signals proportional to the motor current and voltage. The generator excitation control is well known in the art and is usually designed to excite a generator field, not shown, to produce a constant horsepower output from the generator for any given control setting.

FIG. 2 is a constant power curve for several traction motors connected in parallel. For low speed operation with the generator sections connected in parallel, the generator output will range from 100% maximum bus current to point A occurring at 37% of maximum current and 55% of maximum voltage. The generator cannot operate for a sustained time at higher voltages which are required at higher motor speeds. Thus when motor speed is increasing, the transition relay 36 is designed to be energized to pick up at point A to cause the output sections to be changed to series connection. When connected in series, the generator can operate in the range from 100% maximum voltage to 45% voltage and 45% current shown at point B. Thus when motor speed is decreasing, the transition relay 36 is designed to drop out at point B to effect a change from series to parallel.

Referring again to FIG. 1 to describe the circuit operation, it is assumed that the motors 34 are operating at low speed so that the SCR 32 is non-conductive and the rectifier bridges 14 and 18 are connected in parallel via the diode 26 and 30 between the buses 24 and 28. As motor speed increases, the current will decrease and the voltage will increase as shown in FIG. 2 until point A is reached whereupon the transition relay is energized to initiate operation of the SCR control operation 40 to be described below. Under control of that circuit, the SCR control circuit 22 of the rectifier bridge 18 will be phased back to reduce the voltage from bridge 18 to zero. If desired, the voltage decrease may occur rapidly. The bus voltage remains unchanged since the rectifier bridge 14 still supplies the voltage called for at point A in FIG. 2. The generator excitation control 46 changes the field excitation to cause the output section 12 and the bridge 14 to produce sufficient current to make up for that no longer supplied through the bridge 18. Thus the output section 12 will be operating above its rated capacity for a short time which is permitted by the machine design. When the output voltage of the bridge 18 is at zero, the SCR 32 is gated on to connect bridges 14 and 18 in series across the buses 24 and 28. Then the SCR's 22 are gradually phased on to slowly increase the voltage output of the bridge 18. Simultaneously by operation of the generator excitation control 46, the output section 12 and associated bridge 14 will be reduced in voltage so that the sum of the bridge voltages remains essentially constant during the transition period. It should be noted that the diodes 26 and 30 are backbiased during series operation so that current flow is confined to the series circuit. Thus mechanical or other switching is unnecessary to break the parallel connections which were made through those diodes.

In changing from high speed to low speed mode of operation, when the motor voltage decreases to point B in FIG. 2 the transition relay drops out to cause the SCR's 22 to gradually modulate the bridge 18 output to zero and simultaneously the generator excitation control 26 operating on output section 12 increases the output of rectifier 14 to full voltage to keep the bus voltage constant. Then the SCR 32 is turned off to break the series connection and the SCR's 22 are gated back on to return the output of the bridge 18 to its normal voltage. The latter voltage change of the bridge 18 can take place quickly since it requires no corresponding voltage change in the rectifier bridge 14: only a current change in the bridge 14 is required and this can be effected rapidly by the generator excitation control 46 whenever the bridge 18 begins supplying current to the load. Thus the transition between series and parallel occurs smoothly without any disturbance to the power flow to the motors 34.

FIG. 3 illustrates the SCR control circuit 40. A pair of switch contacts 36a and 36b are operated by the transition relay 36 of FIG. 1. The relay is so designed that the contacts 36a and 36b are normally closed and open respectively as shown in the drawing. When the transition relay is energized, contact 36a opens instantly and contact 36b closes after a time delay which is long enough to allow reduction of the voltage of bridge 18 to zero. When the transition relay is de-energized, the contact 36b opens instantly and the contact 36a closes after a time delay sufficient to allow the voltage of bridge 18 to decrease to zero.

Contact 36a is serially connected with resistors 50 and 52 and gate control windings 54 across positive and negative terminals of a power supply, not shown. The control windings 54 form a part of a gate control 56, not shown in detail, for supplying SCR gate control signals on lines 44. Such gate control circuits are well known and may, for example, use magnetic amplifiers controlled by the windings 54. A capacitor 58 is connected between the junction of the resistors 50 and 52 and the negative power supply terminal. The contact 36b is connected to the positive power supply terminal and to a diode 60 connected between contact 36a and resistor 50 and is further connected through a diode 62 and a gate control winding 64 to the negative power supply terminal. The winding 64 in a gate control circuit 66 provides gate control signals on line 42 which operates the SCR 32.

The operation of the circuit of FIG. 3 as well as the total system operation is explained with reference to FIGS. 4 and 5 which reveal the bus voltage and current, the voltage of each rectifier 18 and 14 and the state of SCR switch 32. FIG. 4 depicts the transition from parallel to series generator connection while FIG. 5 depicts the transition from series to parallel.

During normal low speed operation, when the generator output sections are in parallel, relay contacts 36a and 36b are in the normal position as shown so that there is no current supplied to the windings 54, thus the SCR 32 is non-conductive and the SCR's 22 are fully conductive.

When the transition relay 36 is energized to initiate the transition to series connection, the contact 36a immediately opens and the capacitor 58 discharges through the windings 54 in a gradually decreasing manner to phase back the signals on lines 44 so that the rectifier bridge 18 is reduced to zero voltage at time $t_1$ as shown in FIG. 4c. When the time delay expires at $t_2$, the contact 36b closes to pass current to the control winding 64 to render the SCR switch 32 conductive as shown in FIG. 4e. Simultaneously, current is supplied through diode 60 to charge capacitor 58 thereby gradually increasing current control through control windings 54 to phase on the SCR's 22 until they are fully conductive at time $t_3$ thereby increasing the voltage of bridge 18. During the period between $t_2$ and $t_3$, the voltage of the rectifier bridge 14, under control of the generator excitation control 46, decreases correspondingly to the increase in voltage of the bridge 18. Thus as shown in FIG. 4a and 4b, the bus voltage and current remains constant throughout the transition.

When the transition relay senses a decrease of bus current and signals for a transition to a parallel generator connection, the contact 36b opens instantly to turn off the gate of the SCR switch 32 as shown by the dotted line in FIG. 5e at time $t_4$. However, the gate signal is ineffective to turn off the SCR switch 32 while it is conducting. At the same time the current flow through diode 60 ceases so that the capacitor 58 discharges to effect a decrease of the rectifier bridge 18 output voltage which reduces to zero volts by time $t_5$. During this period the rectifier bridge voltage increases correspondingly. When at $t_5$ the bridge 18 voltage reaches zero, the SCR switch 32 is able to turn off to place the bridges 14 and 18 in parallel. Thereafter at time $t_6$, the contact 36a closes to charge the capacitor 58 and phase on the SCR's 22 to increase the voltage of the bridge 18 which reaches its full voltage at time $t_7$. As shown in FIGS. 5a and 5b, the transition has occurred without disruption of the bus voltage or current.

The embodiments of the invention in which an exclusive property or privilege is claimed are defined as follows:

1. In a system for transmitting electrical power from an AC generator having two similar output sections to a load, a generator transition circuit for smoothly changing the generator output between a high current, low voltage mode and a low current, high voltage mode comprising
   first and second rectifier means connected respectively to said output sections to provide DC power from each section,
   first and second conductors connected to the load,
   switch means for connecting the rectifier means in series between the first and second conductors to provide a high voltage, low current mode when the switch means is conductive,
   means for connecting the rectifier means in parallel to provide a low voltage high current mode including a pair of circuit paths, each circuit path including a diode allowing conduction only when the said switch means is nonconductive for connecting each rectifier means respectively between the first and second conductors, voltage modulating controlled rectifier means in said first rectifier means for controllably varying the output voltage of the first rectifier means, transition signal means for initiating a desired transition from one mode to another, means responsive to the transition signal means for gating the voltage modulating controlled rectifier means to reduce the output voltage of the said first rectifier means to substantially zero, operating the switch means when the output voltage is so reduced and, after the switch means is operated, gating the modulating controlled rectifier means to increase the output voltage of the said first rectifier means, the voltage of the said first rectifier means being changed gradually when the output sections are connected in series, and generator excitation control means for controlling the output voltage of said second rectifier means such that the combined output voltage of said first and second rectifier means is held substantially constant while the output voltage of said first rectifier means is being varied and the said rectifier means are connected in series.

2. In a system for transmitting electrical power from an AC generator having two similar output sections to a load, a generator transition circuit for smoothly changing the generator output from a high current, low voltage mode to a low current, high voltage mode comprising first and second rectifier means connected respectively to said output sections to provide DC power from each section, first and second conductors connected to the load, switch means for connecting the rectifier means in series between the first and second conductors to provide a high voltage, low current mode when the switch means is conductive, means for connecting the rectifier means in parallel to provide a low voltage high current mode including a pair of circuit paths each including a diode allowing conduction only when the said switch means is nonconductive, each circuit path connecting each rectifier means respectively between the first and second conductors, voltage modulating controlled rectifier means in said first rectifier means for controllably varying the output voltage of the first rectifier means, transition signal means for initiating a desired transition from parallel to series connection of the rectifier means, means responsive to the transition signal means for gating the voltage modulating controlled rectifier means to reduce the output voltage of the said first rectifier means to substantially zero, means for rendering the switch means conductive when the output voltage is so reduced to thereby connect the rectifier means in series, and means effective after the switch means is conductive for gating the modulating controlled rectifier means to gradually increase the output voltage of the said first rectifier means, and generator excitation control means for gradually decreasing the output voltage of said second rectifier means such that the combined output voltage of said first and second rectifier means is held substantially constant during the said gradual increase of the output voltage of the first rectifier means.

3. In a system for transmitting electrical power from an AC generator having two similar output sections to a load, a generator transition circuit for smoothly changing the generator output from a low current, high voltage mode to a high current, low voltage mode comprising first and second rectifier means connected respectively to said output sections to provide DC power from each section, first and second conductors connected to the load, switch means for connecting the rectifier means in series between the first and second conductors to provide a high voltage, low current mode when the switch means is conductive, means for connecting the rectifier means in parallel to provide a low voltage high current mode including a pair of circuit paths each including a diode allowing conduction only when the said switch means is nonconductive, each circuit path connecting each rectifier means respectively between the first and second conductors, voltage modulating controlled rectifier means in said first rectifier means for controllably varying the output voltage of the first rectifier means, transition signal means for initiating a desired transition from series to parallel connection of the rectifier means, means responsive to the transition signal means for gating the voltage modulating controlled rectifier means to gradually reduce the output voltage of the said first rectifier means to substantially zero, means for rendering the switch means nonconductive when the output voltage is so reduced to thereby connect the rectifier means in parallel, and means effective after the switch means is nonconductive for gating the modulating controlled rectifier means to increase the output voltage of the said first rectifier means, said generator excition control means for gradually increasing the output voltage of said second rectifier means such that the combined output voltage of said first and second rectifier means is held substantially constant during the said gradual reduction of the output voltage of the first rectifier means.

* * * * *